(12) United States Patent
Corleto et al.

(10) Patent No.: US 7,861,410 B2
(45) Date of Patent: Jan. 4, 2011

(54) HEAT TREATED DEVOLATILIZER NOZZLE

(75) Inventors: Carlos R. Corleto, Seabrook, TX (US); Jose M. Sosa, Deer Park, TX (US)

(73) Assignee: Fina Technology, Inc., Houston, TX (US)

( * ) Notice: Subject to any disclaimer, the term of this patent is extended or adjusted under 35 U.S.C. 154(b) by 1552 days.

(21) Appl. No.: 10/703,977

(22) Filed: Nov. 7, 2003

(65) Prior Publication Data

US 2005/0097748 A1 May 12, 2005

(51) Int. Cl.
*B23P 15/16* (2006.01)
(52) U.S. Cl. .............................. 29/890.143; 29/890.142; 29/557
(58) Field of Classification Search ............. 29/890.142, 29/890.143, 890.14, 557
See application file for complete search history.

(56) References Cited

U.S. PATENT DOCUMENTS

| | | | |
|---|---|---|---|
| 4,294,652 A | 10/1981 | Newman | 159/2.1 |
| 4,934,433 A * | 6/1990 | Aboul-Nasr | 159/43.1 |
| 5,118,388 A | 6/1992 | Aboul-Nasr | 159/2.1 |
| 5,540,813 A | 7/1996 | Sosa et al. | 159/47.1 |
| 5,874,525 A | 2/1999 | Krupinski | 528/502 R |
| 6,007,761 A * | 12/1999 | Nakagawa et al. | 266/103 |

FOREIGN PATENT DOCUMENTS

| JP | 57-109590 | * | 7/1982 | 228/151 |
|---|---|---|---|---|
| JP | 64-47878 | * | 2/1989 | |

OTHER PUBLICATIONS

Online Dictionary, Merriam-Webster, Definition for "Volatile", item #5.*

* cited by examiner

*Primary Examiner*—David P Bryant
*Assistant Examiner*—Sarang Afzali
(74) *Attorney, Agent, or Firm*—Tenley R. Krueger (57) ABSTRACT

A method is provided for perforating a steel plate, forming a devolatilizer nozzle from the steel plate, and heat treating the devolatilizer nozzle. The devolatilizer nozzle may have a yield strength of at least about 110 ksi, and a tensile strength of at least about 140 ksi. The perforations in the steel plate are holes in the nozzle and may be no more than about 0.05 inches in diameter. The thickness of the steel plate may be from about 0 to about 0.75 inches. The nozzle may include at least about 500,000 perforations where the center-to-center hole distance may be at least about 0.08 inches. The capacity of the devolatilizer nozzle may be from about 0 to about 75,000 pounds per hour.

46 Claims, 6 Drawing Sheets

HEAT TREATED DEVOLATILIZER NOZZLE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

This invention relates generally to devolatilizer nozzles, and, more particularly, to a method of forming a heat treated devolatilizer nozzle capable of improving devolatilization while also maintaining or increasing production capacities.

BACKGROUND OF THE INVENTION

Reduction of contaminants, such as monomers and volatiles, in polymer resins is desirable. One method of reducing the volatile content of (i.e., devolatilizing) such polymers involves increasing the exposed surface area of the resin and accordingly promoting the release of volatiles. An apparatus commonly employed in this operation is known as a devolatilizer nozzle. Examples of devolatilizer nozzles may be found in U.S. Pat. Nos. 5,540,813, 4,294,652, 4,934,433, 5,118,388 and 5,874,525, which are incorporated herein by reference. Such a nozzle may take various shapes, and is generally perforated to permit polymer flow. The nozzle may be hollow such that molten polymer may be pumped into the hollow interior. The pressure of pumping the polymer into the nozzle also forces the polymer through the perforations or holes in the nozzle. The pressure drop across the nozzle associated with forcing molten polymer through the nozzle varies depending on many factors, including polymer viscosity and density, nozzle hole diameter, temperature, flow rate, and nozzle size. The nozzle must be designed to withstand such pressure.

In general, smaller nozzle hole diameters are desirable because they increase devolatilization. On the other hand, pressure on the nozzle may increase as nozzle hole diameters decrease. Thus, to achieve enhanced devolatilization via reduced nozzle hole diameters, the strength and robustness of the devolatilizer nozzle must be enhanced in response to the increased operating pressures.

Higher strength steels may be more resistant to higher pressures, but generally also possess lower ductility and greater hardness, which present manufacturing and reliability issues when producing devolatilizer nozzles. The lower ductility and greater hardness make it more difficult to perforate the metal and roll it into the hoop or circular shape of a nozzle. In addition, the greater hardness of the higher strength steels make them more susceptible to brittle failure.

Thus, improvements in devolatilizer nozzle design that increase devolatilization (i.e., allow smaller hole diameters), account for pressure increases, allow increased production rates, and control manufacturing and material costs are desirable.

SUMMARY OF THE INVENTION

In an embodiment, a method is provided for perforating a steel plate, forming a devolatilizer nozzle from the steel plate, and heat treating the devolatilizer nozzle. In another embodiment, the devolatilizer nozzle has a yield strength of at least about 110 ksi. In another embodiment, the devolatilizer possesses a tensile strength of at least about 140 ksi. In another embodiment, the perforations in the steel plate are holes in the nozzle and are no more than about 0.05 inches in diameter. In another embodiment, the thickness of the steel plate is from about 0 to about 0.75 inches. In another embodiment, the nozzle includes at least about 500,000 perforations. In another embodiment, the center-to-center hole distance is at least about 0.08 inches. In another embodiment, the capacity of the devolatilizer nozzle is from about 0 to about 75,000 pounds per hour.

In an embodiment, a devolatilizer formed from a heat treated and perforated steel plate is provided. In another embodiment, the devolatilizer possesses a yield strength of at least about 110 ksi. In another embodiment, the devolatilizer nozzle possesses a tensile strength of at least 140 ksi. In another embodiment, holes or perforations in the devolatilizer nozzle are no more than about 0.05 inches in diameter. In another embodiment, the devolatilizer nozzle includes at least about 500,000 perforations. In another embodiment, the devolatilizer nozzle has a capacity of from about 0 to about 75,000 pounds per hour.

In an embodiment, a method of processing polymer resins is provided. The molten polymer is fed into a devolatilizer nozzle where it is devolatilized as it passes through perforations in the devolatilizer nozzle. The devolatilizer nozzle is a heat treated and and perforated steel plate. In an embodiment, the capacity of the devolatilizer nozzle is from about 0 to about 75,000 pounds per hour.

DETAILED DESCRIPTION OF THE INVENTION

Figure 1:
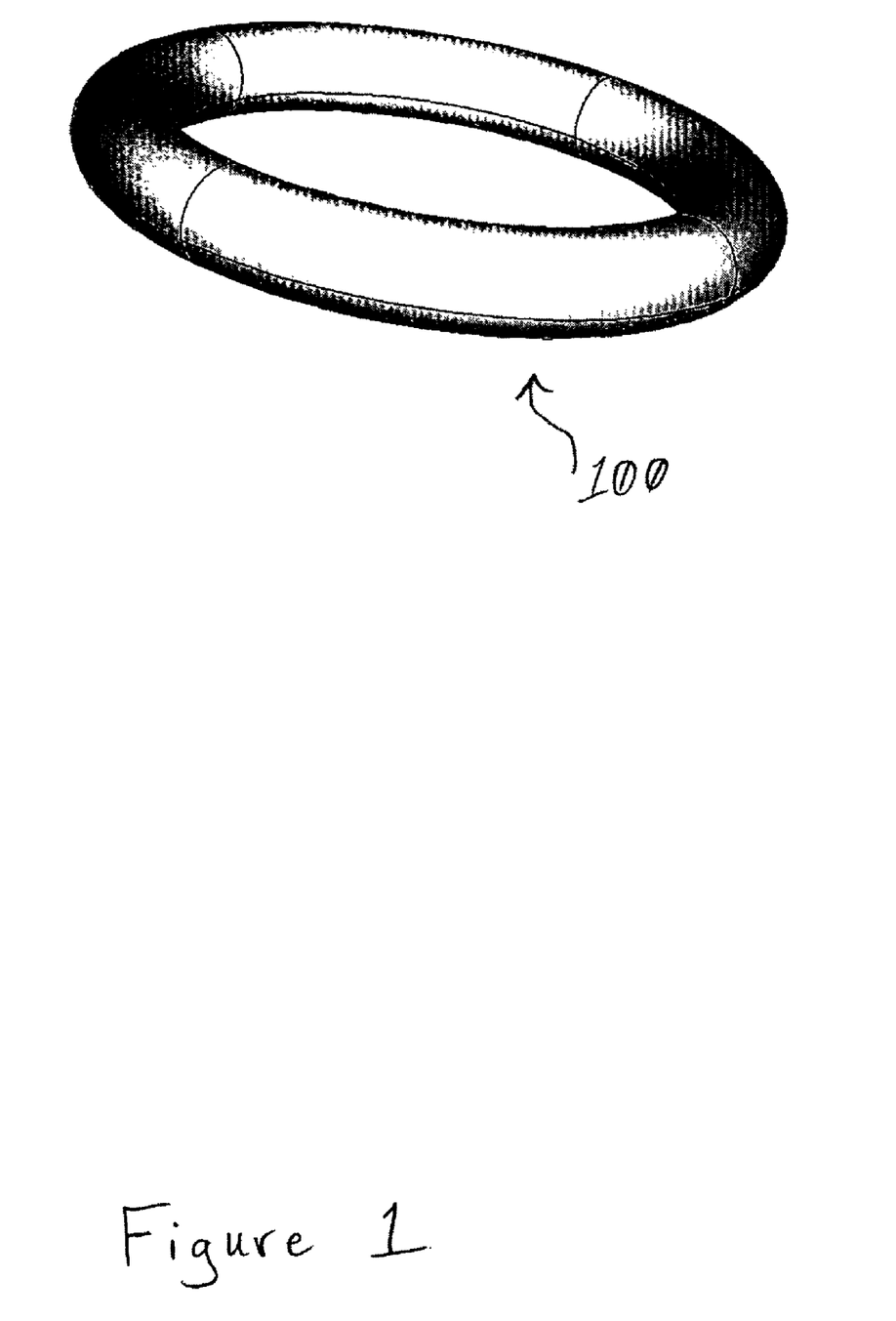
FIG. 1 illustrates an embodiment of the shape of a devolatilizer nozzle.

Devolatilizer nozzles and methods of making same are provided. FIG. 1 illustrates an embodiment of the shape of a devolatilizer nozzle 100 as provided herein. The nozzle 100 is shown without perforations/holes. The nozzle may take any shape that permits polymer to flow through perforations in order to effect devolatilization. Accordingly, the hoop- or donut-shape of the embodiment in FIG. 1 is hollow such that molten polymer may be pumped into the hollow interior. The pressure of pumping the polymer into the hollow interior of the nozzle forces the polymer through perforations (not shown) in the surface of the nozzle, thereby provoking devolatilization.

Figure 2:
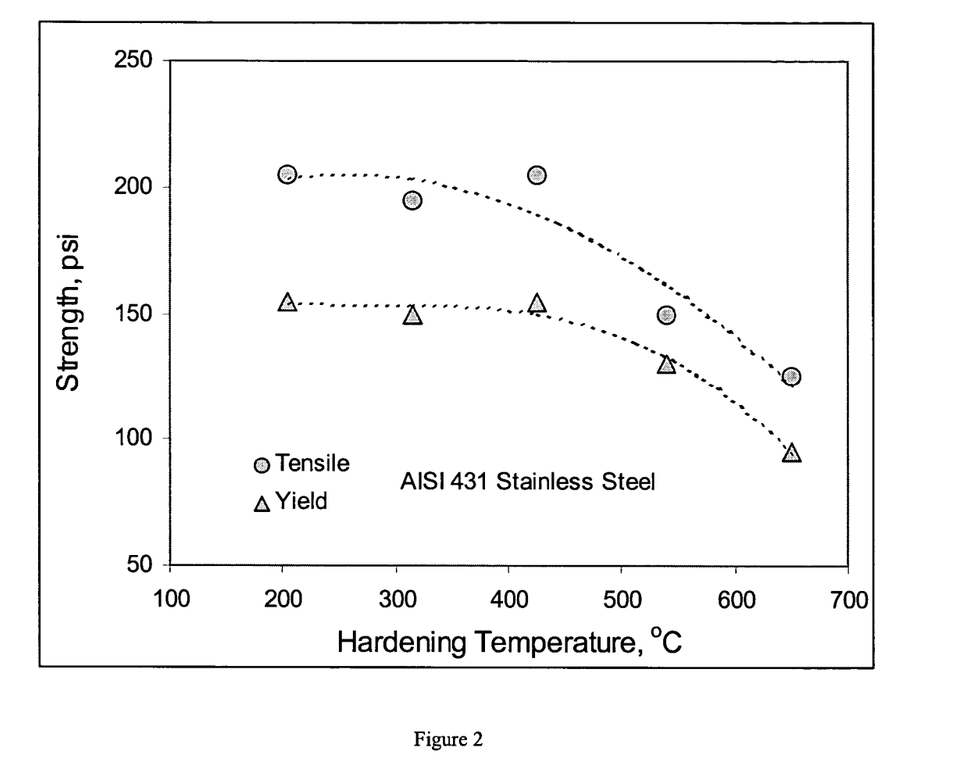
FIG. 2 illustrates example data showing the relationship between strength and hardening temperature for a stainless steel.

In an embodiment of the devolatilizer nozzle and method of making same provided herein, a steel plate is perforated, formed into a devolatilizer nozzle, and heat treated. The heat treatment or tempering results in a stronger finished nozzle capable of withstanding the greater operating pressures associated with smaller nozzle hole diameters, which enhance devolatilization. Additionally, rather than using a material for the nozzle that meets increasing strength requirements without tempering, employment of a heat treatment to achieve a stronger finished nozzle permits use of a starting material that is more ductile. The more ductile starting material is better able to undergo the perforating and nozzle forming steps required in nozzle manufacturing. The more ductile starting material when tempered is also not as hard and results in a heat treated nozzle that is more resistant to brittle failure. The heat treatment described herein may be any heat treatment capable of achieving the nozzle characteristics described in this application. Such heat treatments may be those typical in the art of metal tempering. In an embodiment, the heat treatment is performed at a temperature of at least about 200 degrees Celsius. In another embodiment, the heat treatment is performed at a temperature of at least about 300 degrees Celsius. FIG. 2 is a chart of example data showing the relationship between tensile strength and yield strength, and hardening temperature for AISI 431 stainless steel.

The strength of the devolatilizer nozzle provided herein is sufficient to withstand operating pressures associated with forcing polymer through the nozzle holes. Factors contributing to a determination of suitable nozzle strength include hole diameter, center-to-center hole distance (i.e., total number of holes or perforations), nozzle wall thickness, and mass flow rate. Yield strength is one characteristic of the nozzle that is enhanced by heat treating/tempering. In an embodiment, the yield strength of the heat treated devolatilizer nozzle provided herein is at least about 110 ksi at 275 degrees Celsius. In another embodiment, the yield strength is at least about 200 ksi at 275 degrees Celsius. In another embodiment, the yield strength is at least about 270 ksi at 275 degrees Celsius. In addition to yield strength, the tensile strength of the nozzle is enhanced via tempering. In an embodiment, the tensile strength of the heat treated devolatilizer nozzle provided herein is at least about 140 ksi at 275 degrees Celsius. In another embodiment, the tensile strength is at least about 210 ksi at 275 degrees Celsius. In another embodiment, the tensile strength is at least about 290 ksi at 275 degrees Celsius.

Figure 3:
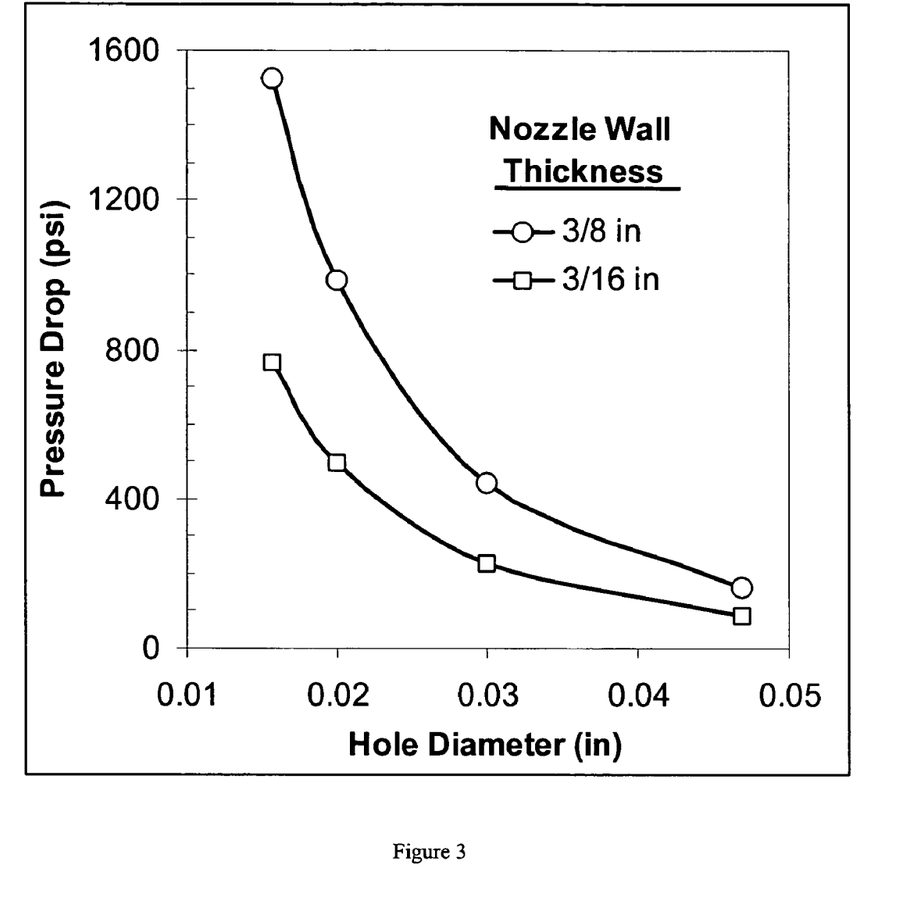
FIG. 3 illustrates example data showing the increase in pressure as hole diameter decreases.

Decreasing hole diameter to achieve enhanced devolatilization increases pressure stresses on the devolatilizer nozzle. Heat treating or tempering the nozzle to increase strength may at least partially compensate for such effects. The example data in FIG. 3 illustrates the decrease in pressure as hole diameter increases for two different nozzle wall thicknesses. The level of acceptable pressure drop across the devolatilizer nozzle may be limited by the capacity of the pump planned to move the polymer through the nozzle. In an embodiment, the hole diameter for the devolatilizer nozzle described herein is no more than about 0.01 inches in diameter. In another embodiment, the hole diameter is no more than about 0.03 inches in diameter. In another embodiment, the hole diameter is no more than about 0.05 inches in diameter.

The thickness of the nozzle walls may be considered. Generally, costs increase as nozzle wall thickness increases. As nozzle wall thickness increases, pressure drop across the nozzle also increases. Correspondingly, as pressure drop increases with nozzle wall thickness, pump capacity must increase to offset pressure drop. Thus, thicker nozzle walls require a more expensive pump, and are more difficult to heat treat. In addition to increasing pump costs, the cost of producing a nozzle increases with wall thickness as the costs associated with manufacturing a nozzle may become prohibitive as nozzle wall thickness increases. Thicker steel is generally more difficult and costly to perforate and form into a nozzle. Thus, there is a limit on thickness that must be balanced against cost and manufacturability.

Figure 4:
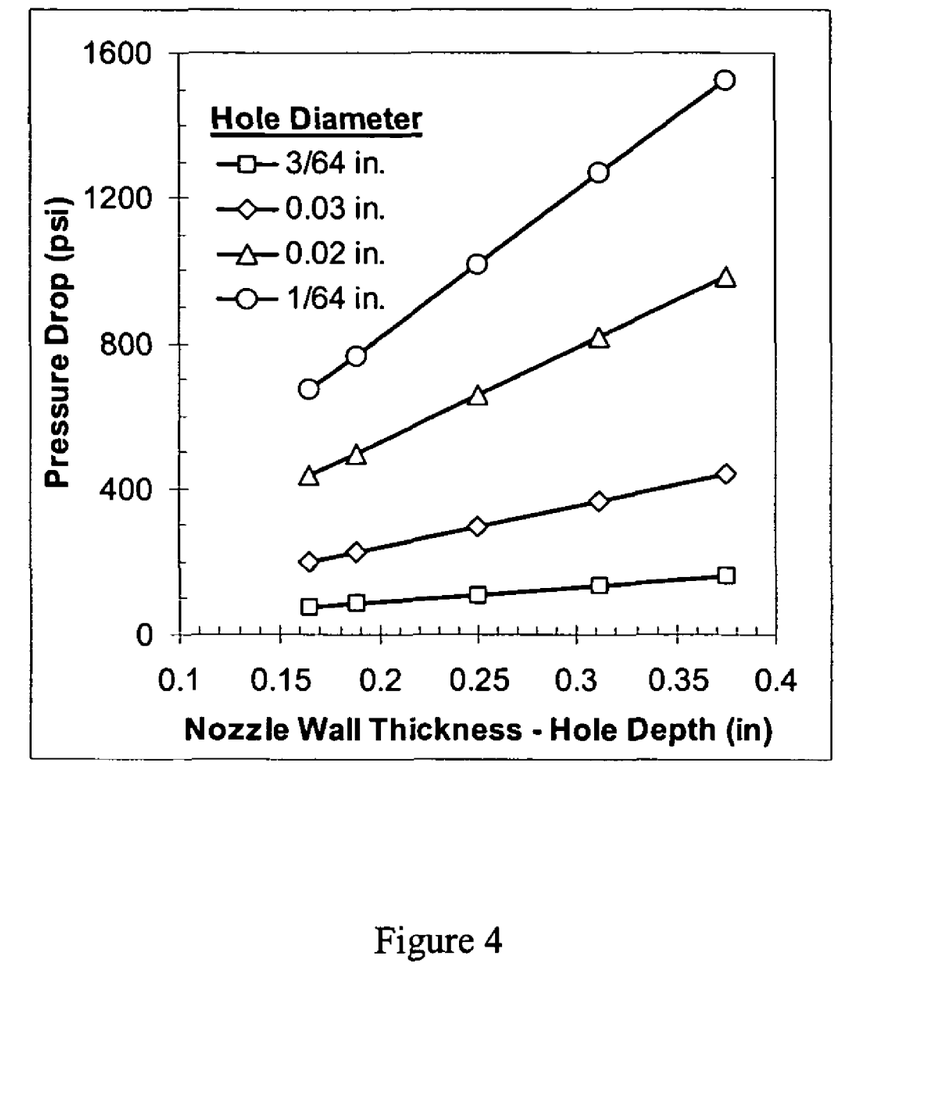
FIG. 4 illustrates example data showing the relationship between wall thickness and pressure for different hole diameters.

Nozzle wall thickness may also influence acceptable hole diameter. In general, reducing hole diameter is desirable to increase devolatilization, but reducing hole diameter also increases pressure drop across the nozzle. As pressure drop increases, stresses on the nozzle wall and pump capacity requirements also increase. Thus, nozzle wall strength must be designed to accommodate any increases in pressure drop (i.e., decreases in hole diameter). The example data charted in FIG. 4 illustrates the relationship between wall thickness and pressure for different hole diameters. Although pressure increases about 9 to 9.5 times going from a hole diameter of about 3/64 inch to about 1/64 inch at any thickness, it also decreases approximately 2.3 times going from about 0.375 to about 0.165 inches in nozzle wall thickness at any hole diameter. Thus, in addition to improvements in cost and manufacturability, reducing nozzle wall thickness may partially offset any pressure drop increase associated with decreasing hole diameter. In an embodiment, the thickness of the steel plate employed in forming the devolatilizer nozzle provided herein is from about 0 to about 0.75 inches. In another embodiment, the thickness of the steel plate is no more than about 0.4 inches. In another embodiment, the thickness of the steel plate is no more than about 0.25 inches.

The devolatilizer nozzle provided herein is formed from a steel plate. The type of steel selected must be such that prior to tempering it is sufficiently ductile to minimize manufacturing difficulties during the steps of perforating the plate and rolling it into the shape of a nozzle. If the steel plate is not sufficiently ductile or is overly hard, resulting manufacturing difficulties may raise costs. Harder steels are also more susceptible to brittle failures. A balance may be achieved between the need for greater strength and the need for manufacturability. In an embodiment, the steel plate is annealed to enhance ductility prior to perforating and forming the nozzle.

In addition to possessing sufficient ductility, the type of steel must be such that tempering raises the yield and tensile strengths to values provided herein. In an embodiment, the steel plate is made of a stainless steel. In another embodiment, the steel plate is made of a 420 stainless steel according to American Iron and Steel Institute (AISI) standards. In another embodiment, the steel plate is made of a 420F stainless steel according to AISI standards. In another embodiment, the steel plate is made of a 440A stainless steel according to AISI standards.

The steel plate is perforated and the perforations in the steel plate represent the holes in the devolatilizer nozzle. Methods of perforating the steel plate are known in the field and it is understood that one skilled in the art of devolatilizer nozzle design/manufacture would be capable of accomplishing the perforations/holes described herein. In an embodiment, perforation of the steel plate occurs prior to forming the nozzle. The quantity of perforations is generally determined by, among other considerations discussed herein, mass flow rate and center-to-center hole distance. If mass flow rate and tolerable center-to-center hole distance are determined, the necessary quantity of perforations and, equivalently, total nozzle surface area, may be readily calculable. In an embodiment, the devolatilizer nozzle described herein includes at least about 500,000 perforations. In another embodiment, the devolatilizer nozzle described herein includes at least about 1,000,000 performations. In another embodiment, the devolatilizer nozzle described herein includes at least about 1,500,000 performations.

Figure 5:
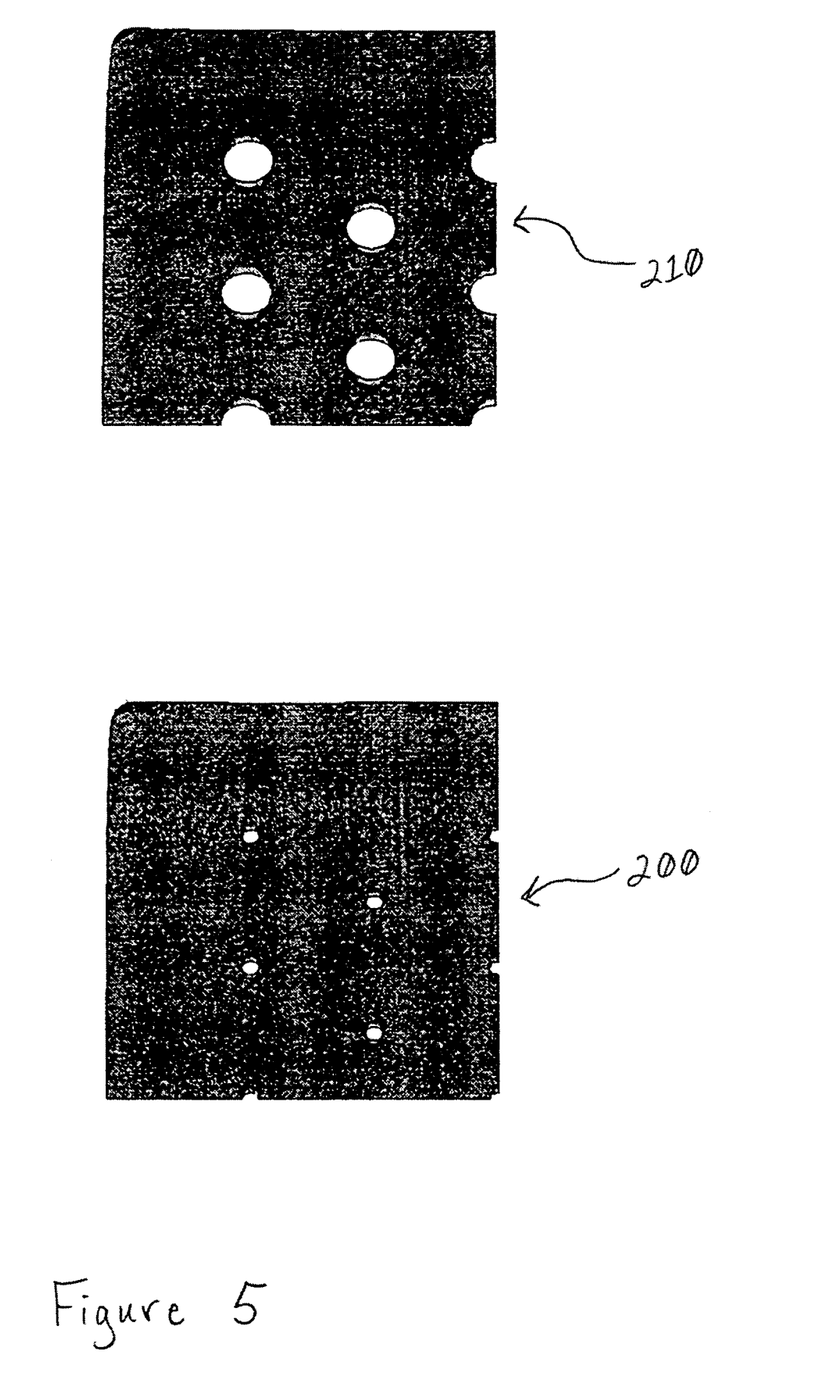
FIG. 5 illustrates embodiments of sections of two different devolatilizer nozzle walls having two different hole diameters.

A nozzle's center-to-center hole distance is generally constant, and may be a function of, among other things, pressure tolerances and hole diameter. FIG. 5 illustrates embodiments of sections of two different devolatilizer nozzle walls 200, 210 having two different hole diameters. The holes of the first nozzle section 200 are smaller than the holes of the second nozzle section 210, yet the center-to-center hole distance remains constant. The holes in the nozzle detract from the integrity of the nozzle wall, thus hole diameter and center-to-center hole distance are among the contributing factors that determine a nozzle's stress concentration factor. In an embodiment, the devolatilizer nozzle provided includes a center-to-center hole distance of at least about 0.08 inches. In another embodiment, the center-to-center hole distance is at least about 0.13 inches. In another embodiment, the center-to-center hole distance is at least about 0.18 inches.

Figure 6:
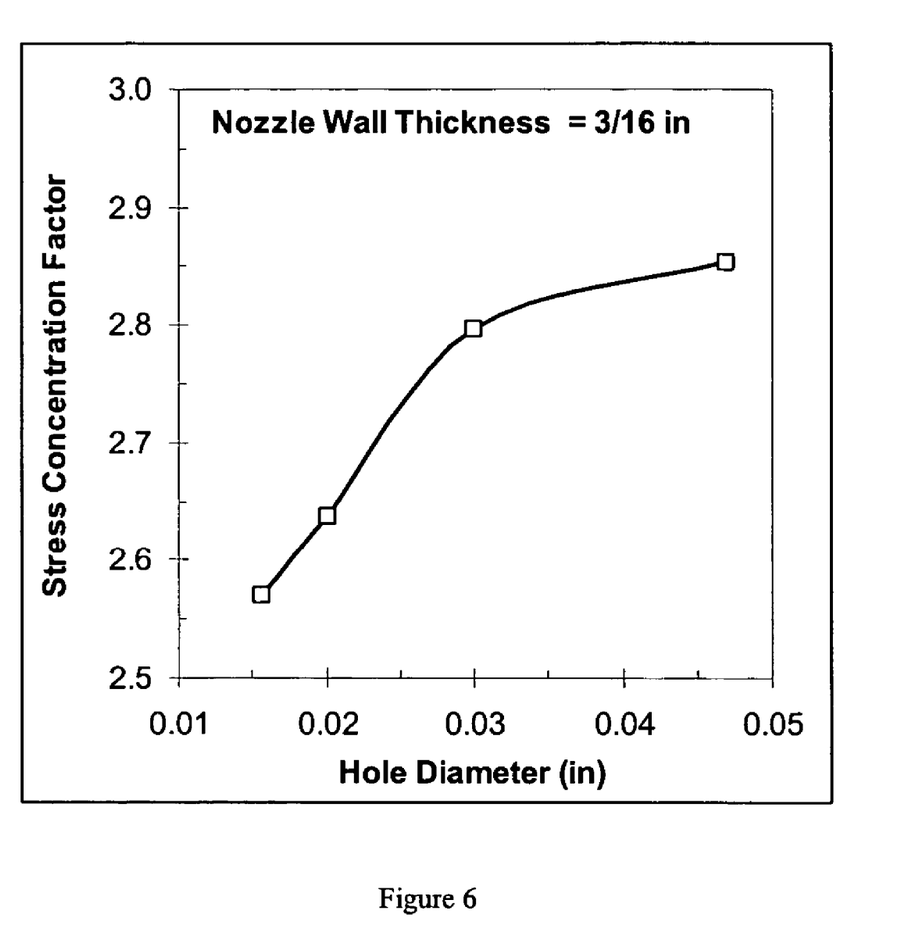
FIG. 6 illustrates example data showing stress concentration factor.

FIG. 6 illustrates example data for stress concentration factor. The example of FIG. 6 shows increasing stress concentration for increasing hole diameter, where center-to-center hole distance is about 5/32 inches and the thickness of the steel plate is about 3/16 inch. For constant flow rate and center-to-center hole distance, decreasing hole diameter also decreases the stress concentration. This is true because decreasing hole size with constant center-to-center hold distance increases the amount of material between holes. The converse is also true: as hole size increases and, with constant center-to-center hole distance, the amount of material between holes decreases, the stress concentration factor increases.

Generally, hole diameter and flow rate, all other things remaining constant, are directly proportional to each other. Thus decreases in hole diameter for improved devolatilization require a lower flow rate. The heat treatment and resulting strength of the nozzle provided herein, however, at least somewhat counterbalance this effect so that higher flow rates are maintained for smaller nozzle hole diameters. In an embodiment, the capacity of the devolatilizer nozzle provided herein is from about 0 to about 75,000 pounds per hour. In another embodiment, the capacity of the devolatilizer nozzle provided herein is from about 20,000 to about 50,000 pounds per hour.

While the present invention has been illustrated and described in terms of particular apparatus and methods of use, it is apparent that equivalent techniques and ingredients may be substituted for those shown, and other changes can be made within the scope of the present invention as defined by the appended claims.

The particular embodiments disclosed herein are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What we claim as our invention is:

1. A devolatilizer nozzle comprising a heat treated and perforated steel plate, wherein said devolatilizer nozzle has a yield strength of at least about 110 ksi.

2. The nozzle of claim 1 wherein said perforations comprise holes of no more than about 0.05 inches in diameter.

3. The nozzle of claim 2 wherein said devolatilizer nozzle comprises a center-to-center hole distance of at least about 0.08 inches.

4. The nozzle of claim 2 whereto said devolatilizer nozzle comprises a center-to-center hole distance of at least about 0.13 inches.

5. The nozzle of claim 2 wherein said devolatilizer nozzle comprises a center-to-center hole distance of at least about 0.18 inches.

6. The nozzle of claim 1 wherein said devolatilizer nozzle has a yield strength of at least about 200 ksi.

7. The nozzle of claim 1 wherein said devolatilizer nozzle has a yield strength of at least about 270 ksi.

8. The nozzle of claim 1 wherein said devolatilizer nozzle has a tensile strength of at least 140 ksi.

9. The nozzle of claim 1 wherein said devolatilizer nozzle has a tensile strength of at least 210 ksi.

10. The nozzle of claim 1 wherein said devolatilizer nozzle has a tensile strength of at least 290 ksi.

11. The nozzle of claim 1 wherein said perforations comprise holes of no more than about 0.01 inches in diameter.

12. The nozzle of claim 1 wherein said perforations comprise holes of no more than about 0.03 inches in diameter.

13. The nozzle of claim 1 wherein the thickness of said steel plate is from about 0 to about 0.75 inches.

14. The nozzle of claim 1 wherein the thickness of said steel plate is no more than about 0.4 inches.

15. The nozzle of claim 1 wherein the thickness of said steel plate is no more than about 0.25 inches.

16. The nozzle of claim 1 wherein said devolatilizer nozzle comprises at least about 500,000 perforations.

17. The nozzle of claim 1 wherein said devolatilizer nozzle comprises at least about 1,000,000 perforations.

18. The nozzle of claim 1 whereto said devolatilizer nozzle comprises at least about 1,500,000 perforations.

19. The nozzle of claim 1 wherein said steel plate comprises 420 stainless steel.

20. The nozzle of claim 1 wherein said steel plate comprises 420F stainless steel.

21. The nozzle of claim 1 wherein said steel plate comprises 440A stainless steel.

22. The nozzle of claim 1 wherein the capacity of said devolatilizer nozzle is from about 0 to about 75,000 pounds per hour.

23. The nozzle of claim 1 wherein the capacity of said devolatilizer nozzle is from about 20,000 to about 50,000 pounds per hour.

24. A method comprising:
    perforating a steel plate;
    forming a devolatilizer nozzle from said steel plate;
    heat treating said devolatilizer nozzle; and
    passing a volatile component through the perforations in the devolatilizer nozzle, wherein said steel plate comprises at least about 500,000 perforations and said perforations comprise holes of no more than about 0.05 inches in diameter.

25. The method of claim 24 wherein said heat treating increases the yield strength of said devolatilizer nozzle.

26. The method of claim 24 wherein said heat treating increases the tensile strength of said devolatilizer nozzle.

27. The method of claim 24 wherein said devolatilizer nozzle has a yield strength of at least about 110 ksi.

28. The method of claim 24 wherein said devolatilizer nozzle has a yield strength of at least about 200 ksi.

29. The method of claim 24 wherein said devolatilizer nozzle has a yield strength of at least about 270 ksi.

30. The method of claim 24 wherein said devolatilizer nozzle has a tensile strength of at least 140 ksi.

31. The method of claim 24 wherein said devolatilizer nozzle has a tensile strength of at least 210 ksi.

32. The method of claim 24 wherein said devolatilizer nozzle has a tensile strength of at least 290 ksi.

33. The method of claim 24 wherein said perforations comprise holes of no more than about 0.01 inches in diameter.

34. The method of claim 24 wherein said perforations comprise holes of no more than about 0.03 inches in diameter.

35. The method of claim 24 wherein the thickness of said steel plate is from about 0 to about 0.75 inches.

36. The method of claim 24 wherein the thickness of said steel plate is no more than about 0.4 inches.

37. The method of claim 24 wherein the thickness of said steel plate is no more than about 0.25 inches.

38. The method of claim 24 wherein said devolatilizer nozzle comprises at least about 1,000,000 perforations.

39. The method of claim 24 wherein said devolatilizer nozzle comprises at least about 1,500,000 perforations.

40. The method of claim 24 wherein said devolatilizer nozzle comprises a center-to-center hole distance of at least about 0.08 inches.

41. The method of claim 24 wherein said devolatilizer nozzle comprises a center-to-center hole distance of at least about 0.13 inches.

42. The method of claim 24 wherein said devolatilizer nozzle comprises a center-to-center hole distance of at least about 0.18 inches.

43. The method of claim 24 wherein said steel plate comprises 420 stainless steel.

44. The method of claim 24 wherein said steel plate comprises 420F stainless steel.

45. The method of claim 24 wherein said steel plate comprises 440A stainless steel.

46. A method comprising:

perforating a steel plate;

forming a devolatilizer nozzle from said steel plate;

heat treating said devolatilizer nozzle; and passing a volatile component through the perforations in the devolatilizer nozzle; and annealing said steel plate prior to forming a devolatilizer nozzle.

* * * * *